United States Patent
Lin (10) Patent No.: US 7,813,003 B2
(45) Date of Patent: Oct. 12, 2010

(54) METHOD AND APPARATUS OF COLOR CONVERSION

(75) Inventor: Hsin-I Lin, Yilan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 331 days.

(21) Appl. No.: 11/691,504

(22) Filed: Mar. 27, 2007

(65) Prior Publication Data

US 2008/0165397 A1    Jul. 10, 2008

(30) Foreign Application Priority Data

Jan. 4, 2007    (TW) .............................. 96100327 A (51) Int. Cl.
- *H04N 1/60* (2006.01)
- *H04N 5/21* (2006.01)
- *H04N 9/68* (2006.01)
- *H04N 9/64* (2006.01)
- *G06K 9/00* (2006.01)
- *G09G 5/02* (2006.01)
- *G03F 3/08* (2006.01)

(52) U.S. Cl. .................. 358/1.9; 358/518; 358/520; 345/600; 382/162; 382/165; 382/167; 348/630; 348/645; 348/649; 348/703

(58) Field of Classification Search ................ 358/520, 358/1.9, 518; 382/162, 165, 167; 348/630, 348/645, 649, 703; 345/600
See application file for complete search history.

(56) References Cited

U.S. PATENT DOCUMENTS

| | | | | |
|---|---|---|---|---|
| 6,434,266 | B1 * | 8/2002 | Kanno et al. | 382/162 |
| 6,445,816 | B1 * | 9/2002 | Pettigrew | 382/162 |
| 6,507,372 | B1 * | 1/2003 | Kim | 348/630 |
| 7,450,183 | B2 * | 11/2008 | Lee et al. | 348/630 |
| 2007/0285434 | A1 * | 12/2007 | Lin et al. | 345/600 |

* cited by examiner

*Primary Examiner*—Charlotte M Baker
(74) *Attorney, Agent, or Firm*—Jianq Chyun IP Office (57) ABSTRACT

A method and an apparatus of color-space conversion are provided herein. When adjustment of saturation and/or hue is performed on a RGB color signal, pixel luminance will be influenced to some extent. In the conversion method of the present invention, luminance compensation will be performed after global or local adjustment to keep the pixel luminance from being influenced by the color-space conversion. The luminance compensation method is to adjust a compensation value according to a ratio of an adjusted pixel luminance to an original pixel luminance.

8 Claims, 6 Drawing Sheets

METHOD AND APPARATUS OF COLOR CONVERSION

CROSS-REFERENCE TO RELATED APPLICATION

This application claims the priority benefit of Taiwan application serial no. 96100327, filed Jan. 4, 2007. All disclosure of the Taiwan application is incorporated herein by reference.

BACKGROUND OF THE PRESENT INVENTION

1. Field of the Present Invention

The present invention relates to a method and an apparatus of RGB color-space conversion, more particularly, relates to a method and an apparatus of luminance compensation after adjustments of saturation and/or hue.

2. Description of Related Art

H.S.I. (Hue, Saturation, Intensity) color system is defined by a color triangle connected by R, G, B points in a chromaticity diagram. Hue is expressed by angle, regarding the hue of red color as 0 degree, the central point white color as a center point, and then a rotation angle θ from the white-red line in an anticlockwise direction will denote a corresponding color. Saturation is expressed by percentage, the saturation of pure color is 100%, and the saturation of the central white is 0%. Intensity indicates an average of RGB intensities.

The conversion between RGB and HSI can be applied in merge of high-resolution images and low-resolution images. A process of combining a fine fall-waveband black/white image and a coarse multi-spectrum image into a fine color image is to calculate luminance based on the RGB combination, then the luminance is the full-waveband black/white image, if the luminance of an image in the HSI is replaced by a fine black/white image and then the image is returned back to a RGB image, the spatial information of the original fine black/white image is increased, and a color having higher resolution is obtained.

Values of the aforementioned intensity, saturation or hue (indicated by I, S, and H, respectively) are from 0 to 1, 0 to 1 and 0 to 360, respectively. The conversion between RGB and HSI can be performed as following: provided that M is max(R,G,B), i.e. the maximum of RGB, and m is min(R,G,B), i.e. the minimum of the RGB, then:

r=(M-R)/(M-m);
g=(M-G)/(M-m);
b=(M-B)/(M-m);
I=(M+m)/2;
S=0, if M=m;
S=(M-m)/(M+m), if I<=0.5;
S=(M-m)/(2-M-m), if I>0.5;
H=60(b-g), if M=R;
H=60(2+r-b), if M=G;
H=60(4+g-r), if M=B.

Figure 1:
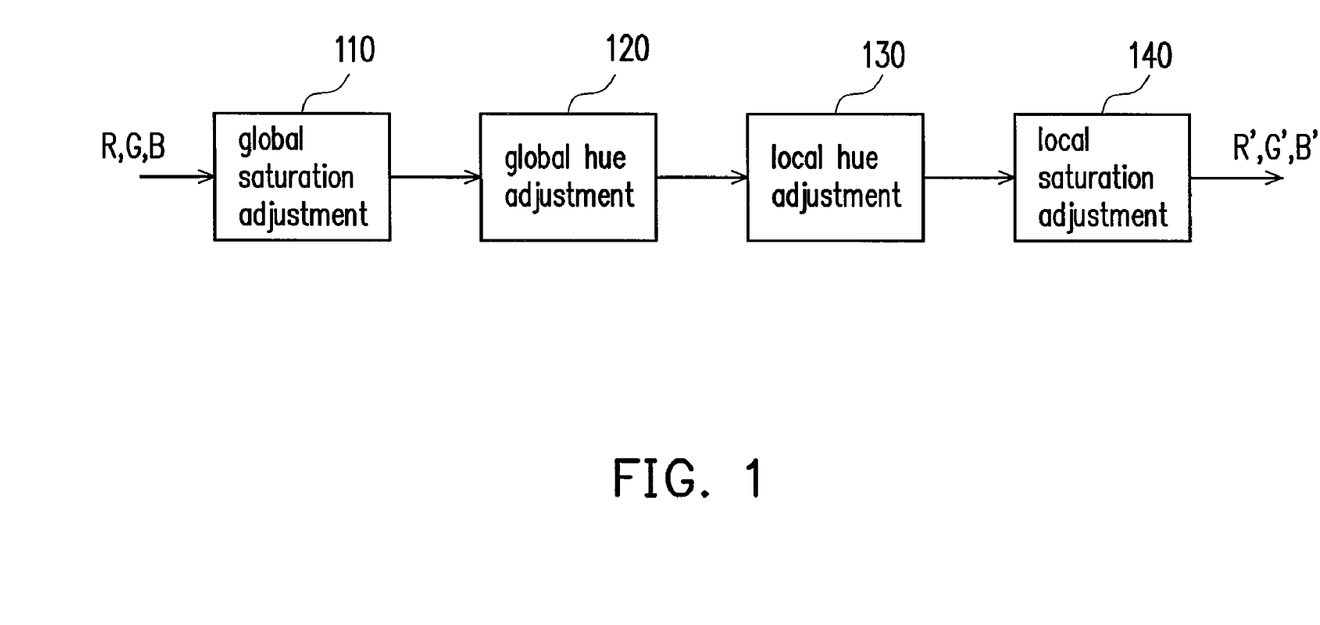
FIG. 1 is a schematic flowchart of a conventional RGB color-space conversion operation based on RGB-HIS conversion.

A conventional operating method of the RGB color-space conversion based on the RGB-HSI conversion is shown in FIG. 1. Firstly, according to step 110, global saturation adjustment is performed on RGB values. Secondly, according to step 120, global hue adjustment is performed on the result of the first step. Thirdly, according to step 130, local hue adjustment is performed on the result of the second step. Finally, according to step 140, local saturation adjustment is performed to obtain R', G' and B' values.

However, when global or local adjustment of hue or saturation is performed during the RGB color-space conversion based on the RGB-HSI conversion, pixel luminance will be changed. That will cause the luminance of images not as good as expected, even result in distortion.

SUMMARY OF THE PRESENT INVENTION

The present invention provides an operating method and an apparatus of RGB color-space conversion, which can perform luminance compensation after each adjustment or all adjustments with respect to either global or local adjustment of saturation or hue to keep pixel luminance from being influenced by the color-space conversion.

The present invention provides an operating method and an apparatus of RGB color-space conversion, which can adjust a luminance compensation value according to a ratio of an adjusted pixel luminance to an original input pixel luminance after each adjustment or all adjustments with respect to either global or local adjustment of saturation or hue to keep pixel luminance from being influenced by the color-space conversion.

The method of color conversion in the present invention comprises: receiving a RGB color signal of a pixel, and performing a color-space conversion on the RGB color signal to adjust saturation or hue thereof. Luminance compensation is performed on the RGB color signal on which the saturation or hue adjustment has been performed to compensate the luminance of the RGB color signal influenced by the saturation or hue adjustment.

In the aforementioned color conversion method, firstly, saturation adjustment is performed on the RGB color signal, and luminance compensation is performed on the RGB color signal on which the saturation adjustment has been performed to compensate the luminance of the RGB color signal influenced by the saturation adjustment. Then, hue adjustment is performed on the RGB color signal on which the saturation adjustment and the luminance compensation have been performed to adjust the hue of the RGB color signal, and luminance compensation is performed on the RGB color signal on which the hue adjustment has been performed to compensate the luminance of the RGB color signal influenced by the hue adjustment.

In the aforementioned color conversion method, the luminance compensation comprises: calculating the luminance of the RGB color signal on which the color-space conversion has been performed; obtaining original luminance of the RGB color signal, and adjusting a luminance compensation value according to the ratio of the luminance after adjustment to the original luminance.

The method of color conversion in the present invention comprises receiving a RGB color signal of a pixel, and saturation adjustment and hue adjustment are performed on the RGB color signal, sequentially. Luminance compensation is performed on the RGB color signal on which the saturation and hue adjustments have been performed to compensate the luminance of the RGB color signal influenced by the saturation and hue adjustments.

The color conversion apparatus in the present invention comprises a color-space adjustment unit and a luminance compensation unit. The color-space adjustment unit receives a RGB color signal of a pixel, performs color-space conversion on the RGB color signal, and outputs a color adjustment signal after saturation and hue adjustments. The luminance compensation unit is coupled to the color-space adjustment unit, receives the RGB color signal and the color adjustment signal, and performs luminance compensation on the color adjustment signal according to the RGB color signal and the color adjustment signal to compensate the luminance of the RGB color signal influenced by the saturation adjustment.

The color conversion apparatus in the present invention comprises a plurality of color-space adjustment units connected in series and a luminance compensation unit. The color-space adjustment units connected in series perform multiple color-space conversion operations on a RGB color signal of a pixel, and output a color adjustment signal after saturation and hue adjustments. The luminance compensation unit is coupled to the color-space adjustment units connected in series, receives the RGB color signal and the color adjustment signal, and performs luminance compensation on the color adjustment signal according to the RGB color signal and the color adjustment signal to compensate the luminance of the RGB color signal influenced by the saturation adjustment.

In the aforementioned luminance compensation unit, the luminance compensation is to adjust a luminance compensation value according to the ratio of the luminance of the RGB color signal to that of the color adjustment signal.

BRIEF DESCRIPTION OF THE DRAWINGS

These and other features and advantages of the present invention will be described and become more apparent from the detailed description of exemplary embodiments when read in conjunction with accompanying drawings.

DESCRIPTION OF THE EMBODIMENTS

The present invention provides an operating method and an apparatus of RGB color-space conversion, such as RGB color-space conversion based on RGB-HSI conversion. With respect to either global or local adjustment of saturation or hue, luminance compensation is performed after each adjustment to keep the luminance of pixels from being influenced by the color-space conversion. In the aforementioned operating method, luminance compensation values are adjusted after each color-space conversion according to a ratio of an adjusted pixel luminance to an original pixel luminance.

Figure 2A:
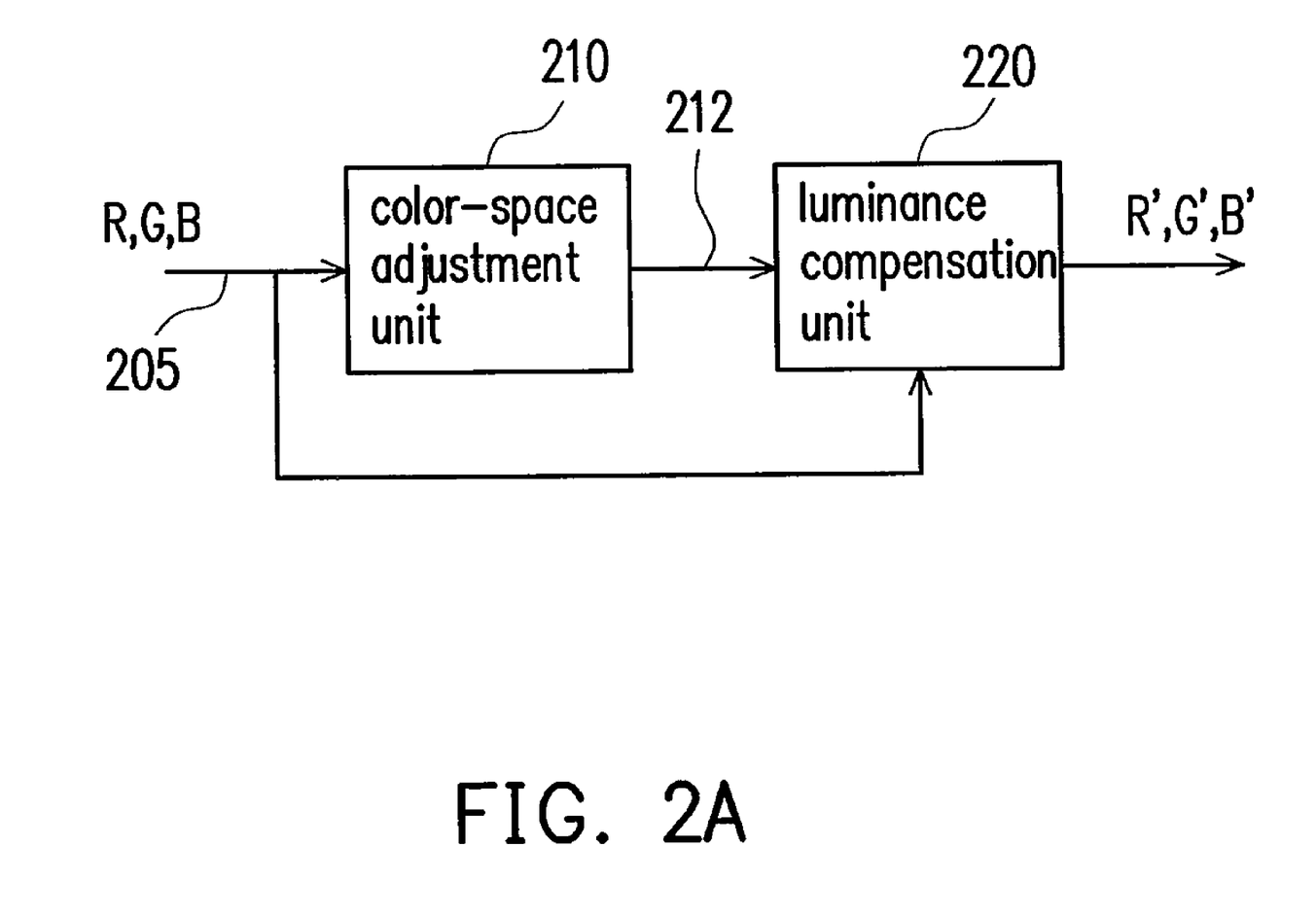
FIG. 2A~2C are schematic flowcharts illustrating a RGB color-space conversion operation according to one preferred embodiment of the present invention.

As shown in FIG. 2A, one preferred embodiment of a RGB color-space conversion apparatus according to the present invention at least comprises a color-space adjustment unit 210 and a luminance compensation unit 220. The color-space adjustment unit 210 receives a RGB color signal 205 of a pixel, such as R, G, B shown in FIG. 2A, and performs color-space conversion on the RGB color signal 205 to output a color adjustment signal 212 after saturation and hue adjustments. The luminance compensation unit 220 is coupled to the color-space adjustment unit 210, receives the RGB color signal 205 and the color adjustment signal 212, and performs luminance compensation on the color adjustment signal 212 according to the RGB color signal 205 and the color adjustment signal 212 to compensate the luminance of the RGB color signal influenced by the saturation and/or hue adjustment.

Figure 2B:
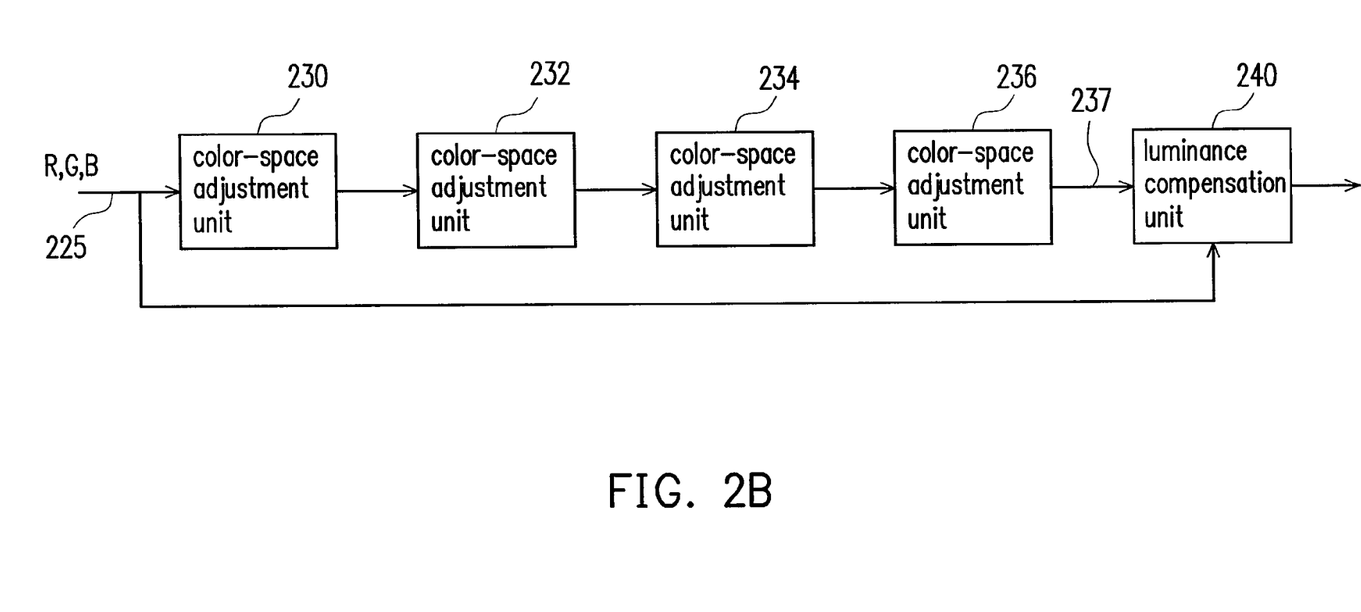

As shown in FIG. 2B, one preferred embodiment of a color conversion apparatus according to the present invention at least comprises a plurality of color-space adjustment units 230, 232, 234 and 236 connected in series and a luminance compensation unit 240. The color-space adjustment units 230-236 connected in series perform multiple color-space conversion operations on a RGB color signal 225 of a pixel, and output a color adjustment signal 237 after saturation and hue adjustments. The luminance compensation unit 240 is coupled to the color-space adjustment units 230-236 connected in series, receives the RGB color signal 225 and the color adjustment signal 237, and performs luminance compensation on the color adjustment signal 237 according to the RGB color signal 225 and the color adjustment signal 237 to compensate the luminance of the RGB color signal influenced by the saturation and/or hue adjustment.

In the aforementioned luminance compensation unit, the luminance compensation is to adjust a luminance compensation value according to the ratio of the luminance of the RGB color signal to that of the adjusted signal.

Figure 2C:
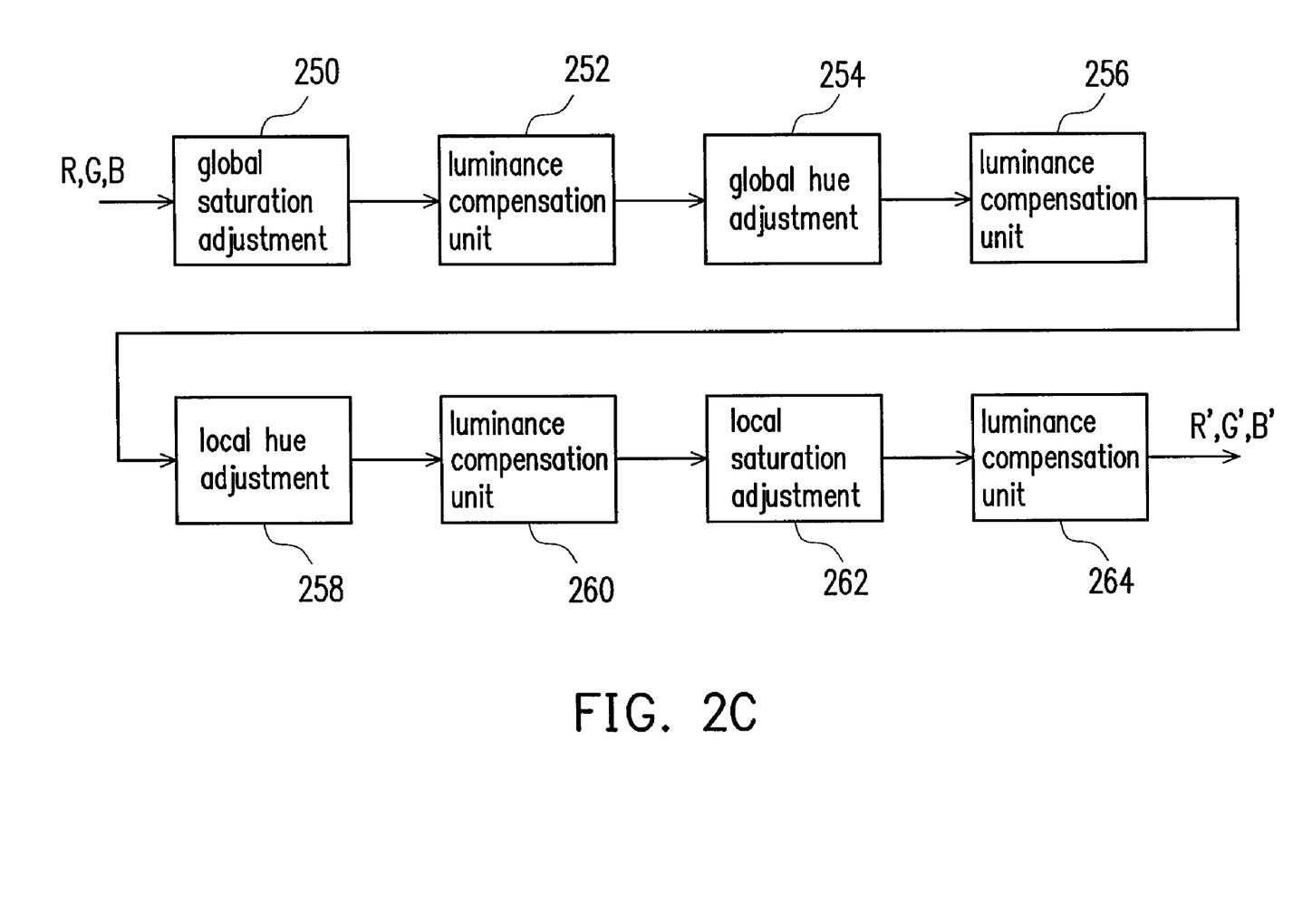

Please refer to FIG. 2C, FIG. 2C is a schematic, block diagram illustrating a RGB color-space conversion operating method based on RGB-HSI conversion according to a preferred embodiment of the present invention. Firstly, in a global saturation adjustment unit 250, a global saturation adjustment is performed on an input RGB color signal. Then, the signal after global saturation adjustment is transmitted to a luminance compensation unit 252 for luminance compensation. The signal after luminance compensation is transmitted to a global hue adjustment unit 254 for global hue adjustment. Subsequently, the signal after global hue adjustment is transmitted to a luminance compensation unit 256 for luminance compensation again. After that, the signal after compensation is further transmitted to a local hue adjustment unit 258 for local hue adjustment. The signal after local hue adjustment is transmitted to another luminance compensation unit 260 for luminance compensation, and then is transmitted to a local saturation adjustment unit 262 for local saturation adjustment. Subsequently, the signal is transmitted to a luminance compensation unit 264 for luminance compensation. Finally, a R'G'B' signal after the color-space conversion operation is obtained.

Figure 3:
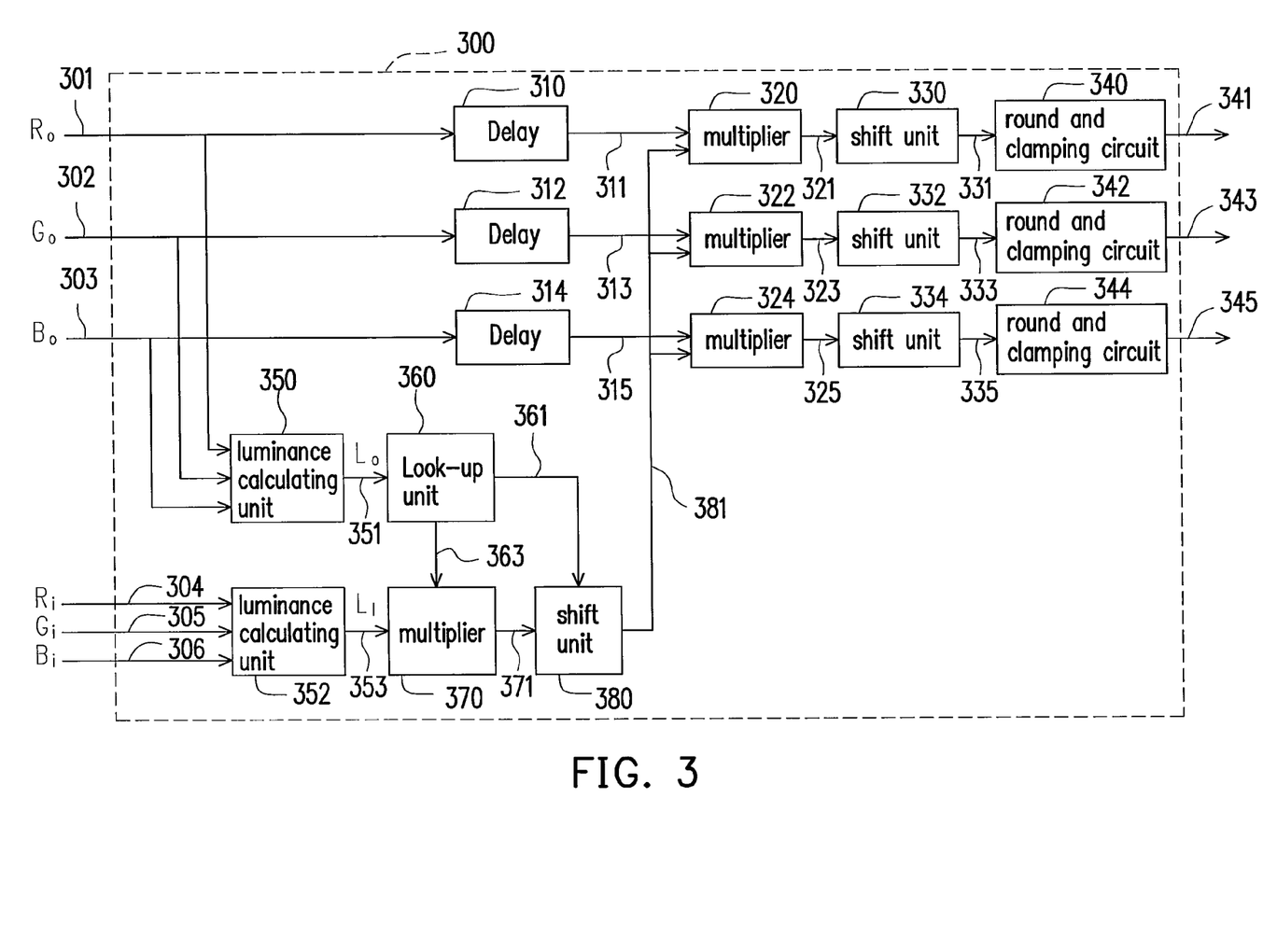
FIG. 3 is a schematic, block diagram illustrating luminance compensation in a RGB color-space conversion operating method according to one preferred embodiment of the present invention.

Please refer to FIG. 3, which is a schematic, block diagram illustrating luminance compensation of the RGB color-space conversion operating method according to one preferred embodiment of the present invention. The luminance compensation circuit 300 includes delay circuits 310-314, multipliers 320-324, round and clamping circuits 340-344, luminance calculating units 350 and 352, a look-up unit 360, a multiplier 370, and a shift unit 380. Firstly, input RGB values are assumed as $R_i$, $G_i$ and $B_i$ (identified by reference numbers 304, 305 and 306, respectively), and output values after color-space conversion are assumed as $R_O$, $G_O$ and $B_O$ (identified by reference numbers 301, 302 and 303, respectively). The $R_O$, $G_O$ and $B_O$ are input into the luminance calculating unit 350 to obtain a luminance $L_o$, i.e. an output pixel luminance after adjustments. The $R_i$, $G_i$ and $B_i$ are input into the luminance calculating unit 352 to obtain a luminance $L_i$ which represents an input pixel luminance.

The aforementioned luminance $L_o$ and $L_i$ can be obtained respectively by the luminance calculating units 350, 352 according to following equation (1):

$$L_t = \frac{1}{2^{19}}(134742 \cdot R_t + 264241 \cdot G_t + 51380 \cdot B_t) \quad (1)$$

Subsequently, a ratio S of the input luminance to the output luminance which can be served as compensation basis is calculated according to the luminance $L_o$ and $L_i$ via following equation (2):

$$S = \frac{L_i}{L_o} \quad (2)$$

The ratio S (i.e. the value of the input luminance divided by the output luminance) can be obtained via the look-up unit 360, the multiplier 370 and the shift unit 380. The luminance $L_o$ is input into the look-up unit 360 to obtain the reciprocal (i.e., $1/L_o$) of the luminance $L_o$, for example, via looking up a look-up table. Then, the reciprocal is input into the multiplier 370 so as to be multiplied by the luminance $L_i$ to obtain $L_i/L_o$. In addition, depending on the magnitude of the luminance $L_o$, arithmetic accuracy can be increased to different scales via the shift unit 380 which can shift rightward K-bit (i.e., different scales $2^{K+L}$ is obtained after shift). Therefore, an output 381 which has been shifted rightward K-bit by the shift unit 380 is transmitted to the multipliers 320, 322 and 324.

Next, the outputs $R_O$, $G_O$ and $B_O$ which have been adjusted are delayed. That is, the RGB color signals 311, 313 and 315 which have been delayed by the delay circuits 310, 312 and 314 are output and transmitted to the multipliers 320, 322 and 324, respectively. The function of delay is primarily to obtain the ratio S of the input luminance to the output luminance before luminance compensation can be performed.

Subsequently, an arithmetic is performed according to following equation (3):

$$\hat{X}_o = S \cdot X_o \quad (3)$$

The output 381 (i.e. the ratio S of the input luminance to the output luminance) of the shift unit 380 is multiplied by the delayed RGB color signals 311, 313 and 315 via the multipliers 320, 322 and 324, respectively. The multiplied results are output to the shift units 330, 332 and 334. For example, results 331, 333 and 335 shifted rightward L-bit are respectively transmitted to the round and clamping circuits 340, 342 and 344. The outputs 341, 343 and 345 prior to perform luminance compensation on the adjusted outputs $R_O$, $G_O$ and $B_O$ are obtained via the round and clamping arithmetic. The round arithmetic is to round the least significant bit (LSB) of a signal, and the clamping arithmetic is to restrict the maximum and/or minimum of an input signal.

Figure 4:
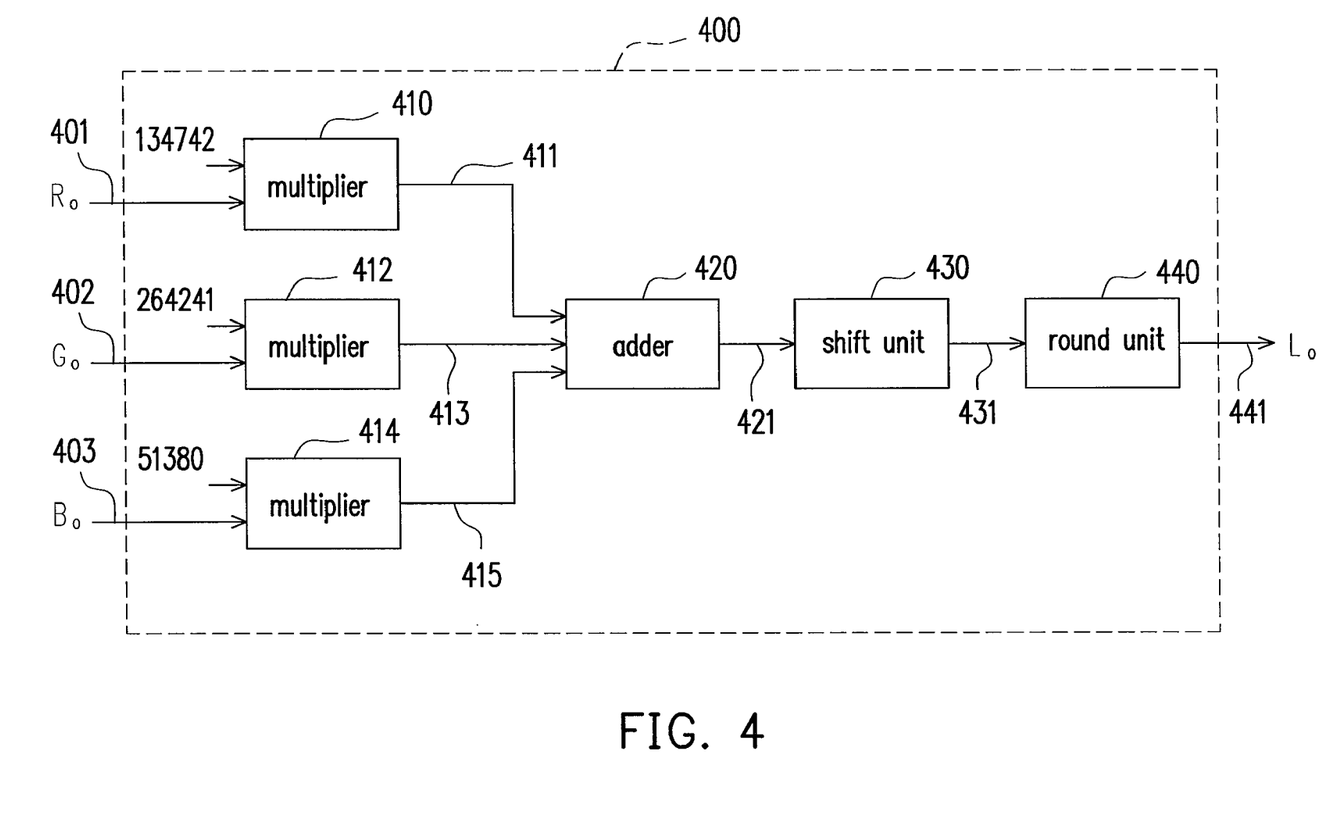
FIG. 4 is a schematic, block diagram illustrating a luminance calculating unit in a luminance compensation circuit according to one preferred embodiment of the present invention.

Please refer to FIG. 4, which is a schematic, block diagram illustrating a luminance calculating unit in the luminance compensation circuit 300 shown in FIG. 3. The luminance calculating unit 400 can perform calculating arithmetic according to equation (1):

$$L_t = \frac{1}{2^{19}}(134742 \cdot R_t + 264241 \cdot G_t + 51380 \cdot B_t)$$

Firstly, the outputs $R_O$, $G_O$ and $B_O$ (shown as reference numbers 401, 402 and 403) which have been adjusted are respectively input to multipliers 410, 412 and 414, and are respectively multiplied by specified values, such as "134742", "264241" and "51380" shown in FIG. 4. The specified values are luminance adjustment values of various colors. For example, R, G and B can be adjusted according to:

$$(134742 \cdot R + 264241 \cdot G + 51380 \cdot B)$$

Then, output results from the multipliers are input to an adder 420. A result 421 obtained by addition is transmitted to a shift unit 430. The shift unit 430 shifts the result 421 obtained by addition rightward 19 bits. That is, the result 421 is divided by $2^{19}$. Subsequently, a result 431 which has been shifted is input to a round unit 440 and rounded therein. Finally, the luminance $L_O$ can be obtained.

The present invention provides an operating method of RGB color-space conversion, which also can be applied in RGB color-space conversion using matrix arithmetic. The matrix arithmetic can be applied in saturation adjustment or hue adjustment, for example. Luminance compensation is performed after each adjustment to keep the luminance of pixels from being influenced by the color-space conversion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of color conversion, comprising:
   receiving a RGB color signal of a pixel; and
   performing a color-space conversion on the RGB color signal for adjusting saturation or hue thereof, wherein luminance compensation is performed on the RGB color signal on which the saturation adjustment or the hue adjustment has been performed, to compensate the luminance of the RGB color signal influenced by the saturation adjustment or the hue adjustment,
   the saturation adjustment is firstly performed on the RGB color signal, and a first luminance compensation is performed on the RGB color signal on which the saturation adjustment has been performed, to compensate the luminance of the RGB color signal influenced by the saturation adjustment, and
   the hue conversion is performed on the RGB color signal on which the saturation adjustment and the luminance compensation have been performed to adjust the hue of the RGB color signal, and a second luminance compensation is performed on the RGB color signal on which the hue adjustment has been performed to compensate the luminance of the RGB color signal influenced by the hue adjustment.

2. The method according to claim 1, wherein the luminance compensation comprising:
   calculating the luminance of the RGB color signal on which the color space conversion has been performed;
   obtaining an original luminance of the RGB color signal; and
   adjusting a luminance compensation value according to a ratio of the luminance after adjustment to that of the original.

3. A method of color conversion, comprising:
   performing a color-space conversion on a RGB color signal for adjusting saturation or hue thereof,
   wherein the saturation adjustment is firstly performed on the RGB color signal, and a first luminance compensation is performed on the RGB color signal on which the saturation adjustment has been performed, the hue adjustment is performed on the RGB color signal on which the saturation adjustment and the first luminance compensation have been performed to adjust the hue of the RGB color signal, and a second luminance compensation is performed on the RGB color signal on which the hue adjustment has been performed.

4. The method according to claim 3, wherein the first luminance compensation comprising:
calculating the luminance of the RGB color signal on which the color space conversion has been performed;
obtaining an original luminance of the RGB color signal; and
adjusting a luminance compensation value according to a ratio of the luminance after adjustment to that of the original.

5. A method of color conversion, comprising:
receiving a RGB color signal of a pixel;
performing saturation adjustment and hue adjustment on the RGB color signal;
performing a first luminance compensation on the RGB color signal on which the saturation adjustment and the hue adjustment have been performed, to compensate the luminance of the RGB color signal influenced by the saturation adjustment and the hue adjustment, wherein the step of performing the saturation adjustment and the hue adjustment occurs before the step of performing the luminance compensation; and
performing a second luminance compensation on the RGB color signal on which the luminance compensation has been performed.

6. The method according to claim 5, wherein the luminance compensation comprising:
calculating the luminance of the RGB color signal on which the saturation adjustment and the hue adjustment have been performed;
obtaining an original luminance of the RGB color signal; and
adjusting a luminance compensation value according to a ratio of the luminance after adjustment to that of the original.

7. A method of color conversion based on RGB-HSI conversion, comprising:
receiving a RGB color signal of a pixel;
performing global saturation adjustment according to values of R, G, and B of the RGB color signal to obtain a global saturation adjustment signal;
performing luminance compensation according to the luminance of the RGB color signal and that of the global saturation adjustment signal, to obtain a first color adjustment signal;
receiving the first color adjustment signal, and performing global hue adjustment on the first color adjustment signal, to obtain a global hue adjustment signal;
performing luminance compensation according to the luminance of the first color adjustment signal and that of the global hue adjustment signal, to obtain a second color adjustment signal;
performing local saturation adjustment on the second color adjustment signal, to obtain a local saturation adjustment signal;
performing luminance compensation according to the luminance of the second color adjustment signal and that of the local saturation adjustment signal, to obtain a third color adjustment signal;
receiving the third color adjustment signal, and performing local hue adjustment on the third adjustment signal, to obtain a local hue adjustment signal; and
performing luminance compensation according to the luminance of the third color adjustment signal and that of the local hue adjustment signal, to obtain a fourth color adjustment signal, wherein the fourth color adjustment signal is the color signal converted from the RGB color single in HSI color space.

8. The method according to claim 7, wherein the method of luminance compensation comprises calculating a ratio of the luminance of the input color single to that of the adjusted color signal, and adjusting a luminance compensation value.

* * * * *